United States Patent
Wolf et al.

(10) Patent No.: US 10,273,334 B2
(45) Date of Patent: Apr. 30, 2019

(54) COMPOSITION FOR POLYMERIC CHAIN EXTENSION

(71) Applicant: CLARIANT PLASTICS & COATINGS LTD, Muttenz (CH)

(72) Inventors: Jürgen Wolf, Ahrensburg (DE); Karen-Alessa Wartig, Hamburg (DE); Tim Van Den Abbeele, Ahrensburg (DE); Tim Lünstäden, Noderstedt (DE)

(73) Assignee: Clariant Plastics & Coatings Ltd, Muttenz (CH)

( * ) Notice: Subject to any disclaimer, the term of this patent is extended or adjusted under 35 U.S.C. 154(b) by 0 days.

(21) Appl. No.: 15/524,554

(22) PCT Filed: Oct. 23, 2015

(86) PCT No.: PCT/EP2015/074630
§ 371 (c)(1),
(2) Date: May 4, 2017

(87) PCT Pub. No.: WO2016/071126
PCT Pub. Date: May 12, 2016

(65) Prior Publication Data
US 2017/0313813 A1     Nov. 2, 2017

(30) Foreign Application Priority Data
Nov. 5, 2014   (EP) ................................ 14003779

(51) Int. Cl.
  *C08G 63/91*   (2006.01)
  *C08G 64/42*   (2006.01)
  *C08G 63/16*   (2006.01)

(52) U.S. Cl.
  CPC ........... *C08G 63/916* (2013.01); *C08G 63/16* (2013.01); *C08G 64/42* (2013.01)

(58) Field of Classification Search
  CPC ............................. C08G 63/916; C08G 63/16
  USPC ......................................................... 524/295
  See application file for complete search history.

(56) References Cited

U.S. PATENT DOCUMENTS

| | | | | |
|---|---|---|---|---|
| 4,698,382 A | * | 10/1987 | McClure | C08K 5/12 524/292 |
| 4,732,722 A | * | 3/1988 | Aida | H01B 3/441 174/120 SC |
| 6,180,251 B1 | * | 1/2001 | Kanai | C08K 5/12 428/457 |
| 2002/0037411 A1 | * | 3/2002 | Frankfort | D01D 5/092 428/395 |

OTHER PUBLICATIONS

Keyfoglu et al., Mater. Res. Soc. Symp. Proc., vol. 856E, BB3.6. 1-BB3.6.6, 2005.*

* cited by examiner

*Primary Examiner* — Hui H Chin
(74) *Attorney, Agent, or Firm* — Morgan, Lewis & Bockius LLP

(57) ABSTRACT

The present invention relates to a composition comprising at least one compound of the formula (1)

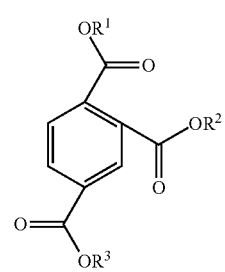

wherein
$R^1$, $R^2$ and $R^3$ are the same or different and denote a $C_1$-$C_{10}$-alkyl, and at least one carrier resin.

17 Claims, No Drawings

COMPOSITION FOR POLYMERIC CHAIN EXTENSION

BACKGROUND OF THE INVENTION

The invention relates generally to concentrates employed in the formation of step-growth polymers, and in particular, to a chain extension concentrate for step-growth polymers.

Many step-growth polymers, including polyesters, polyamides, polycarbonates and polyurethanes are widely used to make plastic products such as films, bottles, sheets and other molded and extruded products. The mechanical and physical properties of these polymers are highly dependent on their molecular weights.

In a life cycle, these materials may experience a synthesis process, followed by an extrusion step and a final processing step which may be another compounding extrusion operation followed by thermoforming, blow molding or fiber spinning or they can be injection molded in the molten state, with all of these steps occurring under high temperature conditions. In addition, in recent years, increased attention has been focused on improved methods of recycling articles made from these polymers, with regarding resource conservation and environmental protection. The processing steps involved in producing and recycling these polymers also involve high temperatures.

In each of these high temperature steps, particularly during the compounding/processing and reclaiming/recycling process some molecular weight degradation in the polymer occurs. This molecular weight degradation may occur via high temperature hydrolysis, alcoholysis or other depolymerisation mechanisms well known for these polycondensates. It is also well known that degradation of molecular weight negatively affects the mechanical, thermal and rheological properties of materials, thus preventing them from being used in demanding applications or from being recycled in large proportions in their original applications. Today recycled or reprocessed polycondensates with deteriorated weight can only be used in very low proportions in demanding applications or in larger proportions in less demanding applications. For instance, due to molecular weight degradation, recycled bottle grade polyethylene terephthalate (PET) is mostly employed exclusively in films and other low end applications. Similarly, recycled polycarbonate from compact disk (CD) scrap, mostly goes to low end applications. For these reasons, the current recycling technologies are limited to a narrow range of applications.

Today, there exists a considerable number of processes which are employed to minimize loss in molecular weight and maintain or even increase the molecular weight of the polycondensates for processing or recycling. Most of these routes employ as main processing equipment either extruder, solid state polycondensation reactor or both in sequence or similar equipment designed for melt or high viscosity material processing. As processing aid in any process, chemical reactants known as "chain extenders" are employed. Chain extenders usually are multi functional molecules which "recouple" polycondensate chains that have depolymerized. These chain extenders were added to the extruder or reactor while processing the polymer. Normally chain extenders possess two or more functional groups which can react with chain fragments, caused by depolymerisation, to bridge and couple them. That process can stop decreasing or even increase molecular weight of polycondensates. There are numerous chain extender types, compositions, polycondensate formulations and processing conditions which will be described.

Di- or polyfunctional epoxides, epoxy resins or other chemicals having two or more epoxy groups are examples of chain extending modifiers which have been used to increase the molecular weight of recycled polymers. These di- or polyfunctional epoxides are made of epichlorohydrin and molecules with two or more terminal hydroxyl groups. Examples of such chain extenders include bis-phenol type epoxy compounds, made of bisphenol-A and epichlorohydrin, novolak type epoxy compounds made of carboxylic acids and epichlorohydrin and glycidyl ethers made of aliphatic alcohols and epichlorohydrin. Additionally, various acrylic copolymers have been used as polymer additives to improve melt strength and melt viscosity of polyesters and polycarbonates. These additives generally include copolymers derived from various epoxy containing compounds and olefins, like ethylene. However, these chain extenders only exhibit moderate success in prohibiting degradation in reprocessed polymers.

Today two main problems persist with the state of the art-solutions. In order to have efficient chain extension at reasonable residence times either in extrusion or solid state reactor systems, most of known chain extenders require the use of pre-dried polycondensate material, operating at vacuum and varying amounts of catalysts and stabilizers to be employed during processing. Without these features the extent of molecular weight increase is limited and the resulting product shows lower molecular weight and less than desired properties.

As the functionality of chain extender increases, so does the number of polycondensate chains that can be coupled onto each chain extender molecule and thus its effectiveness in re-building molecular weight. However it's obvious to see that increasing the functionality of chain extenders also increases degree of branching of the resulting product and the potential onset of gelation. There are negative effects of extensive branching on degree of crystallinity and thus on mechanical properties of semi-crystalline polycondensate, as well as negative implications of the presence of varying amounts of gel in any product. As result of these negative effects there is a limit for the maximum functionality. Effective chain extension currently requires relatively large concentration of lower functionality (<4 functional groups per chain) chain extenders.

The relatively high costs associated with these two limitations of the current art render the re-processing or recycling of these polycondensation uneconomical.

One type of chain extender that has been effective in overcoming the problems encountered by the prior art are those based on epoxy-functionalized styrene acrylic copolymers produced from monomers of at least one epoxy-functional acrylic monomer and at least non-functional styrenic and/or acrylate monomer. These chain extenders also exhibit certain disadvantages when introduced directly into a molding apparatus. The chain extenders are difficult to pelletize or otherwise agglomerate. Furthermore, the epoxy-functionalized styrene acrylic copolymer chain extenders are highly reactive in comparison to prior chain extenders. As a result, with certain applications the epoxy-functional styrene acrylic copolymer chain extenders have a tendency to produce overreaction conditions in the feed or introduction zone of a molding apparatus or extruder. These overreaction conditions are a consequence of the disparity in melting temperature between the epoxy-functional styrene acrylic copolymer chain extenders and the step-growth polymers with which they are employed. The epoxy-functional styrene acrylic copolymer chain extenders have a melting temperature of approximately 50° C., whereas the typical process temperatures for step-growth polymers can range from approximately 240° C. to 300° C. Thus, when the epoxy-functional styrene acrylic copolymer chain extenders are introduced directly to the feed zone of a processing apparatus, the chain extender melts and begins to react with step-growth polymer before proper dispersion and homogenization is achieved. When the epoxy-functional styrene acrylic copolymer chain extenders prematurely react, localized areas of overreaction produce gelation which in turn interferes with proper particle formation. The problem of over reaction is especially pronounced when manufacturing particles having a minimal thickness, such as e.g. fibers or films.

Consequently, there exists a need in the industry for a method and a concentrate composition or masterbatch which can effectively deliver and allow proper homogenization of chain extenders within polymers. Also because of some acrylic epoxy-functionalized chain extenders contain components which may cause cancer.

SUMMARY OF THE INVENTION

Accordingly the present invention is directed to a composition useful in modifying the molecular weight of a step-growth polymer which composition comprises an alkoxy-functionalized trimellitate and at least one carrier resin.

According to a preferred embodiment, the composition includes at least one alkyloxy-functionalized trimellitate and at least one reactive carrier resin.

According to another preferred embodiment, the composition includes at least one alkyloxy-functionalized trimellitate and at least one non-reactive carrier resin.

As the chain extender is physically homogeneously dispersed in the carrier, while the composition is mixed with the polymer, the potential for localized higher concentrations of chain extender is minimized. Furthermore, when introduced into a molding apparatus, the composition of the present invention prevents premature reaction of the alkyloxy-functionalized trimelliticlic acid chain extender within the let down polymer by increasing the time required to melt the concentrate, this delayed reaction time permits the chain extender to be fully dispersed throughout the polymer, resulting in homogeneous chain extension.

Depending on the carrier resin the composition of the invention can be solid or liquid, a solid composition being preferred.

The present invention is directed to a composition comprising at least one compound of the formula (1)

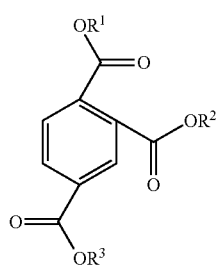

(1)

wherein
$R^1$, $R^2$ and $R^3$ are the same or different and denote a $C_1$-$C_{10}$-alkyl, preferably $C_1$-$C_6$-alkyl, more preferably $C_1$-$C_4$-alkyl, most preferably $C_1$-$C_2$-alkyl, and at least one carrier resin.

Examples for the chain extender of formula (1) are trimethyltrimellitate, triethyltrimellitate, tripropyltrimellitate, tributyltrimellitate, tripentyltrimellitate, trihexyltrimellitate, triheptyltrimellitate, trioctyltrimellitate, trinonyltrimellitate or tridecyltrimellitate.

The preferred chain extender consists of trimethyl trimellitate (TMTM) of formula (2)

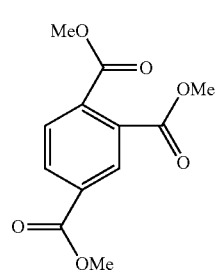

(2)

This molecule can be manufactured by esterification of trimellitic anhydride with methyl alcohol.

The chain extender TMTM can also be combined in any ratio with DMT (dimethyl terephthalat).

The at least one carrier resin is either a non reactive resin, a reactive resin or a mixture thereof. Preferably, a non-reactive carrier resin is utilized in the concentrate composition of the present invention as the non reactive carrier resin provides an inert carrier, thereby preventing the chain extender from reacting until the concentrate composition is dispersed within the let down polymer. The chain extender does not react with the non-reactive carrier resin to cause any appreciable chain extension within the non-reactive carrier resin.

The non reactive carrier resin can be polyethylene, polyethylene-norbornene copolymers, polypropylene, polybutylene, polymethyl pentene, polyethylene-vinyl acetate copolymers, polycarbonate (PC), polystyrene (PS), polystyrene block copolymers, polybutadiene, polyisoprene, polyethylene-butylene, polyacrylates, polyvinyl chloride, chlorinated polyethylene, polyvinylidene chloride, polyethylene-acrylate copolymers, acrylnitril-butadiene-styrene-copolymers (ABS), and mixtures thereof. The preferred non-reactive carrier resin is ABS, PS, and polycarbonate.

The reactive carrier resin can be polyethylene terephthalate, polybutylene terephthalate, polyethylene terephthalate glycol, maleic anhydride grafted polyethylene (MAH-g PE), and a mixture thereof.

The exact ratio of chain extender to carrier resin in the composition of the invention is application specific, depending upon the activity of the carrier resin and the desired degree of chain extension in final polymeric product. The trimellitic acid ester may be present in the composition in amounts between approximately 0.01 to 99.9 wt.-%, preferably between approximately 5.0 and 50.5 wt.-%; and most preferably between 10.0 and 25.0 wt.-%, relative to the total weight of the composition.

Other materials which are substantially chemically inert may be added to the composition depending upon the desired properties of the polymer. Representative examples of such materials include anti-static agents, foaming agents, flame retardants, color concentrates, anti-oxidants, UV stabilizers, anti-block agents, anti-fog agents, anti-slip agents, anti-microbial agents and slip additives.

These other materials can be present in the concentrate composition of the invention in amounts of from 0.001 to 99%, preferably of from 0.001 to 50% by weight, relative to the total weight of composition.

If present, the lower limit of said other materials is expediently 0.01% by weight.

The method by which the composition of the invention is made is not particularly limited and can be accomplished by any known method for dispersive or distributive mixing, preferably by extrusion, e.g. in a twin-screw extruder.

Further, the composition of the present invention can be formed in a variety of geometrical shapes, including, but not limited to pellets, spheres, flakes, agglomerates, prills and the like.

The composition may be used to impart chain extension properties on any let down polymer with at least one carboxyl reactive group. Representative examples of such polymers include step-growth polycondensates such as polyamides, polyesters and polycarbonates. The polymer can also be an addition polymer such as polyurethanes, polystyrene co-maleic anhydride or polyethylene co-acrylic acid.

For said use the composition is expediently melt compounded with the let down polymer in any thermoplastic forming apparatus normally employed in the industry and is melted at a temperature appropriate for melting or softening the let down polymer, in accordance with normal molding techniques. The exact concentration of the composition is dependent upon the desired end characteristic of the let down polymer and is therefore application specific. The amount of the composition to be added to the let-down polymer may range from 0.1 to 50.0 wt.-%, preferably 1.0 to 30.0 wt.-%, more preferably 5.0 to 25.0 wt.-%, relative to the total weight of the composition and the let-down polymer. The residence time which the composition in combination with the let down polymer stays on the extruder can vary between 1 s up to 10000 s, preferably 1 s up to 1000 s, more preferably 10 s up to 600 s, even more preferably 15 s to 100 s, most preferably 20 s to 50 s.

The concentration of the chain extender in the let-down polymer is preferably from 0.01 to 10 wt. %, more preferably from 0.1 to 1 wt. %, even more preferably 0.2 to 0.5 wt %, relative to the total weight of the composition and the let-down polymer.

The composition of the present invention may be used in the manufacture of various polymeric articles, non limiting examples of which includes, polymeric sheets, films, containers, e.g. bottles, fibers or multidimensional articles comprising polycondensates.

The following examples will serve to more fully illustrate the invention. Percentages are weight percent, unless indicated otherwise.

The measurement of the intrinsic viscosity (I.V.) was used to measure the molecular weight of the chain extended polymer as the intrinsic viscosity is a unique function of the molecular weight of a polymer. The I.V. was detected by using a Davenport viscosimeter for melt viscosity measurements, e.g. for PET, in the molten state extruded through a calibrated die using high pressure nitrogen gas.

EXAMPLES

Example 1

Six formulations A-F were extruded in accordance with normal industry procedure using a Leistritz MASS technology (27 mm/40D). Therefor a masterbatch containing 10% of the chain extender in polycarbonate as carrier system was extruded. This masterbatch was incorporated in PET (amounts indicated in Table 1) by extrusion at temperatures between 200 and 300° C. with an average residence time of 35 to 40 s. The intrinsic viscosity (I.V.) was determined relative to neat PET.

TABLE 1

| Sample | Concentration of PET [%] | Concentration of TMTM chain extender in final product [%] | Increase of I.V. relative to neat PET [%] |
| --- | --- | --- | --- |
| A | 100 | 0 | 0 |
| B | 99.9 | 0.1 | 12 |
| C | 99.85 | 0.15 | 16 |
| D | 99.8 | 0.2 | 21 |
| E | 99.775 | 0.225 | 21 |
| F | 99.7 | 0.3 | 27 |

The used PET was RAMAPET® R 180 GR BB (Indorama Plastics, 192 000 g/mol).

Example 2

Nine formulations A-I were extruded in accordance with normal industry procedure using a Leistritz MASS technology (27 mm/40D). Therefor a masterbatch containing 10% of the chain extender in polycarbonate as carrier system was prepared. This masterbatch was incorporated in PET (amounts indicated in Table 2) by extrusion at temperatures between 200 and 300° C. In this trial the residence times of material within the extruder was varied.

TABLE 2

| Sample | Concentration of PET [%] | Concentration of chain extender in finished product [wt.-%] | Residence time [s] | Increase of I.V. relative to neat PET [%] |
| --- | --- | --- | --- | --- |
| A | 100 | 0 | 35 | 0 |
| B | 100 | 0 | 50 | 0 |
| C | 100 | 0 | 64 | 0 |
| D | 99.9 | 0.1 | 35 | 16 |
| E | 99.9 | 0.1 | 50 | 14 |
| F | 99.9 | 0.1 | 64 | 10 |
| G | 99.7 | 0.3 | 35 | 25 |
| H | 99.7 | 0.3 | 50 | 18 |
| I | 99.7 | 0.3 | 64 | 10 |

The used PET was RAMAPET® R 180 GR BB and the chain extender was TMTM.

It is demonstrated that the chain extender works best at shorter residence time with high concentrations in process.

Example 3

Four formulations A-D were extruded in accordance with normal industry procedure using a Leistritz MASS technology (27 mm/40D). Therefor a masterbatch containing 10% of the chain extender on different carrier systems was prepared. This masterbatch was incorporated in PET by extrusion at temperatures between 200 and 300° C.

TABLE 3

| Sample | Concentration of PET [%] | Concentration of chain extender in finished product [%] | Carrier resin | Increase of I.V. relative to neat PET [%] |
|---|---|---|---|---|
| A | 100 | 0 | — | 0 |
| B | 99.9 | 0.1 | PC | 12 |
| C | 99.85 | 0.15 | PC | 16 |
| D | 99.9 | 0.1 | MAH-g PE | 4 |

The used PET was RAMAPET® R 180 GR BB and the chain extender was TMTM.

The invention claimed is:

1. A composition comprising at least one compound of the formula (1)

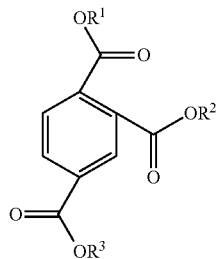

wherein $R^1$, $R^2$ and $R^3$ are the same or different and are a $C_1$-$C_{10}$-alkyl, and
at least one carrier resin which is selected from the group consisting of polyethylene, polyethylene-norbornene copolymers, polypropylene, polybutylene, polymethyl pentene, polyethylene-vinyl acetate copolymers, polycarbonate, polystyrene, polystyrene block copolymers, polybutadiene, polyisoprene, polyethylene-butylene, polyacrylates, polyvinyl chloride, chlorinated polyethylene, polyvinylidene chloride, polyethylene-acrylate copolymers, acrylonitrile-butadiene-styrene copolymers, and mixtures thereof,
wherein the compound of formula (1) is present in an amount of between 1.0 and 99.9 wt.-% relative to the total weight of the composition.

2. The composition as claimed in claim 1, wherein $R^1$, $R^2$ and $R^3$ are the same or different and are a $C_1$-$C_2$-alkyl.

3. The composition as claimed in claim 1, wherein $R^1$, $R^2$ and $R^3$ are methyl.

4. The composition as claimed in claim 1, wherein the carrier resin is a polycarbonate or polypropylene.

5. The composition as claimed in claim 1, wherein the compound of formula (1) is present in an amount of between 5.0 to 50.0 wt.-%, relative to the total weight of the composition.

6. The composition as claimed in claim 1, wherein the compound of formula (1) is present in an amount of between 5.0 and 25.0 wt.-%, relative to the total weight of the concentrate composition.

7. A method for imparting chain extension properties to a let down polymer having at least one carboxyl reactive group, the method comprising melt compounding with the let down polymer a composition comprising at least one chain extender and at least one carrier resin as claimed in claim 1 in a thermoplastic forming apparatus at a temperature sufficient for melting or softening the polymer.

8. A chain extender for step-growth polycondensates, where the chain extender is present in a composition as claimed in claim 1.

9. The chain extender as claimed in claim 8, wherein the polycondensates are polyamides, polyesters, polycarbonates or polyurethanes.

10. The chain extender as claimed in claim 8, wherein the compound of formula (1) is present in an amount of from 1 to 30 wt.-%, relative to the total weight of the composition and the polycondensate.

11. The chain extender as claimed in claim 8, wherein the polycondensates are manufactured into polymeric articles.

12. The chain extender as claimed in claim 11, wherein the polymeric articles are sheets, films, containers or fibers.

13. The method as claimed in claim 7, wherein the let down polymer having at least one carboxyl group is a polycondensate.

14. The method as claimed in claim 13, wherein the polycondensate is selected from the group consisting of polyamides, polyesters, polycarbonates, and polyurethanes.

15. The method as claimed in claim 7, wherein the amount of the composition comprising at least one chain extender and at least one carrier resin which is added to the let down polymer is between 5.0 and 25 wt.-%, relative to the total weight of the composition and the let down polymer.

16. The method as claimed in claim 13, wherein the polycondensate is manufactured into polymeric articles.

17. The method as claimed in claim 16, wherein the polymeric articles are sheets, films, containers or fibers.

* * * * *